UNITED STATES PATENT OFFICE.

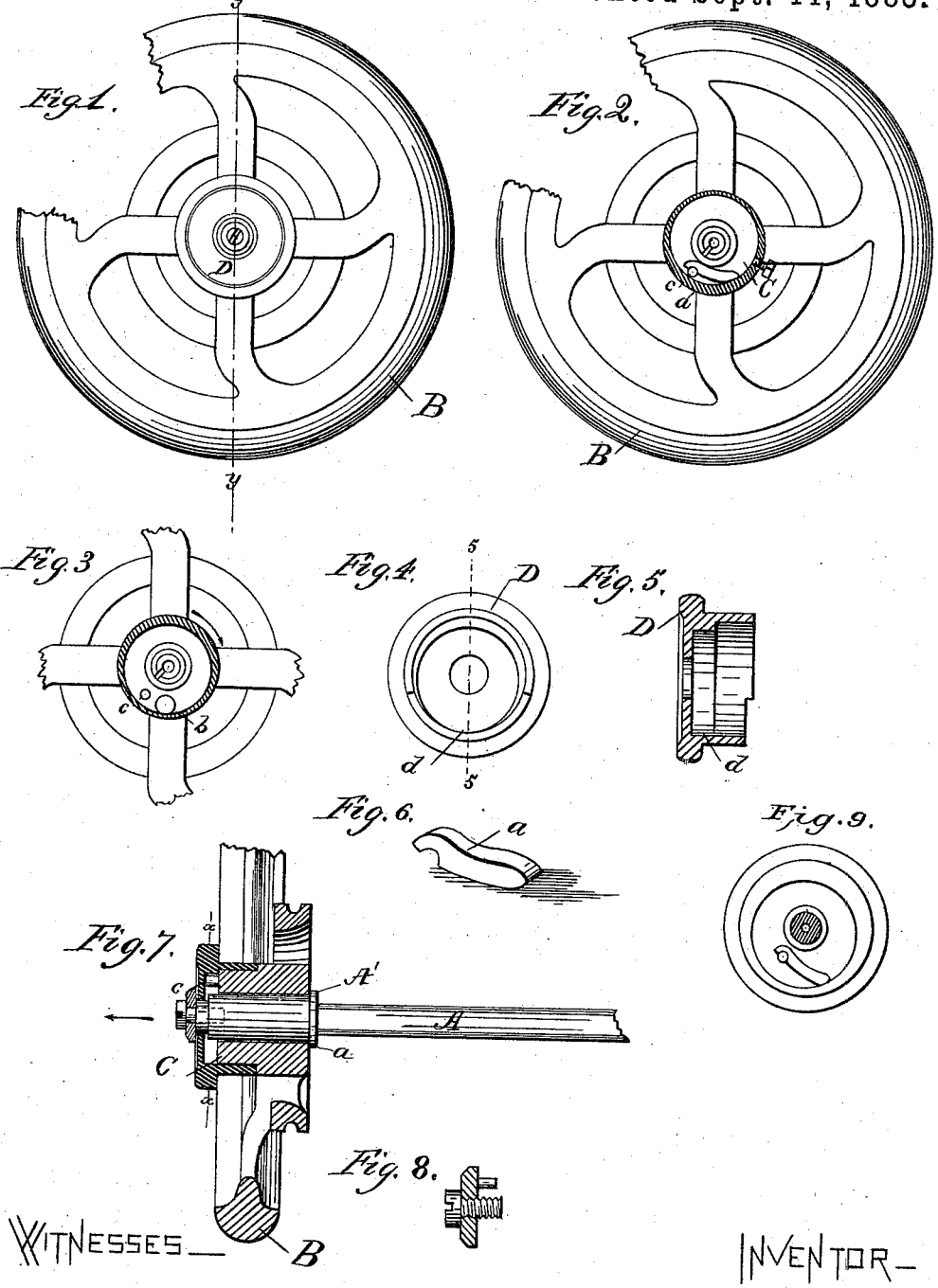

HENRY E. SCOTCHMER, OF CHICAGO, ILLINOIS.

MANNER OF ATTACHING WHEELS TO SHAFTS.

SPECIFICATION forming part of Letters Patent No. 284,678, dated September 11, 1883.

Application filed January 6, 1882. (No model.)

*To all whom it may concern:*

Be it known that I, HENRY E. SCOTCHMER, a citizen of the United States, residing at Chicago, in the county of Cook and State of Illinois, have invented certain new and useful Improvements in the Manner of Attaching Wheels to Shafts, of which the following is a specification.

The object of this invention is to improve, simplify, cheapen, and perfect the method of attaching or applying wheels to shafts, where it is desired that such wheels shall alternately carry the shaft or be loose thereon, and also where it is desired to rotate the wheel in one direction loosely without carrying the shaft, and when the wheel be rotated in the other direction it shall be fast to and carry the shaft.

I am aware that wheels have been constructed to run alternately loose and tight upon shafts, previous to my invention, by the application of springs and screws; but all the methods heretofore in use in this connection have been more or less crude and imperfect in their operation, and expensive in their construction.

It will be noticed that the method of attaching wheels to shafts as invented by me, and herein described, is accomplished by a direct and positive pressure, and without the use or intervention of springs or screws.

I have illustrated my invention by the accompanying drawings, making a part of this specification, in which—

Figure 1 is a view of a balance-wheel attached to the end of a shaft in the manner hereinafter described. Fig. 2 is a view of a balance-wheel attached to the end of a shaft, as hereinafter described, showing the ring containing the eccentric recess in vertical section on line $x\ x$, Fig. 7, and exhibiting the manner in which the impinging lever is caused to perform its office. Fig. 3 is the view of the hub of a wheel attached to a shaft, with the ring containing the eccentric recess in vertical section, same as Fig. 2, and exhibiting the metallic disk or substitute for the lever in its position when placed there, for the purpose hereinafter described. Fig. 4 is an elevation, showing the interior of the ring which is fitted onto the hub of the wheel, and which contains the eccentric recess, and which recess is here shown. Fig. 5 is a sectional view of the same. Fig. 6 is a view of the impinging lever; Fig. 7, a vertical section on line $y\ y$, Fig. 1, minus the lever, and showing the shaft and nut in full line. Fig. 8 is the ordinary screw and washer, placed upon the end of a main or driving shaft of a sewing-machine to hold the balance-wheel in its place. Fig. 9 is a vertical section on line $x\ x$, looking in the direction of the arrow, Fig. 7, and showing the shaft A free to revolve.

Like letters refer to like parts throughout the several views.

A is the shaft upon which the wheel is placed. B is a wheel placed upon said shaft or upon a thimble fixed to the shaft.

C is the hub of said wheel, on which the ring D, having an eccentric recess, $d$, is fitted.

$c$ is a pin placed in the hub C of the wheel B, with which an impinging lever, $a$, engages.

$b$ is a disk forming one part of my invention. In the drawings accompanying this specification, the fulcrum of the impinging lever $a$ is represented by the pin $c$; but said fulcrum may be formed by a suitable recess cut in the hub C of the wheel.

The following concise description of my invention as applied to the main or driving shaft of a sewing-machine will enable those skilled in the art to construct and use the same. Upon the main shaft is fixed a thimble having a collar, $a$, against which the hub C of the fly-wheel abuts. This hub is loose upon the shaft or thimble, and is provided with a ring, D, fitted in any suitable manner to the body of the hub and held in place by any suitable means. The interior of this ring is provided with an eccentric recess, $d$, into which the pin $c$ of the hub C projects. A lever, $a$, is caused to engage with said pin $c$, and by the turning of the ring D partially round in one direction, so as to bring the shortest radius of the eccentric recess near the pin, as shown in Fig. 2, said lever $a$ is forced to engage with the thimble or shaft A, impinging or gripping thereon, and causing said thimble or shaft A to revolve with the wheel B and its hub C, while by turning the ring D partially round in the opposite direction, the pressure of the eccentric recess $d$ being removed from the lever $a$, the impingement ceases, and the shaft A or its thimble is free to revolve in the hub C of the wheel B. By substituting the disk $b$ for the lever and turning the ring D in the direction of the arrow, Fig. 3, the shortest radius of the eccentric recess will force the disk against the pin c and the shaft A or its thimble A', and cause the wheel and shaft to revolve together. By turning the thimble in the opposite direction, the disk will be removed from contact with the shaft, which will be free to revolve without moving the wheel, as shown in Fig. 3. It is obvious that if the shaft be revolved in the direction opposite to that in which the bearing force is against the lever, pin, and eccentric, the ring D will be so shifted that the shaft will not touch the lever or disk.

Having in the foregoing description included to so great an extent the manner in which the devices which I have invented operate, I do not deem it necessary for the purpose of enabling those skilled in the art to fully understand the same to add a separate description of such operation.

I prefer to construct the shaft A, thimble A', hub C, ring D, lever a, and disk b of iron or steel, or other metal; but they may all or either of them be constructed of glass, papier-maché, celluloid, or other suitable substance.

It will be seen that I have described the manner and method of attaching my device to the end of a shaft as applied to a sewing-machine; but it will be readily seen that my invention may be applied to attach or connect a wheel to a shaft at any point on said shaft, for any purpose where the results attained by my invention are desired.

Having thus described my invention, what I claim, and desire to secure by Letters Patent, is—

1. The hub C of a wheel fitted to revolve loosely on shaft A, or a thimble made fast thereto, the ring D, fitted to the hub C, and having the eccentric recess d cut therein, the lever a, and the pin or fulcrum c, all arranged, constructed, operated, and controlled substantially as described, and for the purpose specified.

2. The hub C of a wheel fitted to revolve loosely on shaft A, or a thimble made fast thereto, the ring D, fitted to the hub C, and having the eccentric recess d cut therein, the disk b, and the pin or fulcrum c, all arranged, constructed, operated, and controlled substantially as described, and for the purpose specified.

HENRY E. SCOTCHMER.

Witnesses:
FREDERICK C. GOODWIN,
CHARLES T. BROWN.